(12) United States Patent
Ouzineb et al.

(10) Patent No.: US 10,077,346 B2
(45) Date of Patent: Sep. 18, 2018

(54) METHOD FOR COATING A SUPPORT WITH A DISPERSION BASED ON AN ACRYLIC POLYMER AND A CROSS-LINKING AGENT

(71) Applicant: TORAY FILMS EUROPE, Saint Maurice de Beynost (FR)

(72) Inventors: Keltoum Ouzineb, Lyons (FR); Maria Cristina Penache, Chavanoz (FR)

(73) Assignee: TORAY FILMS EUROPE, Saint Maurice de Beynost (FR)

( * ) Notice: Subject to any disclaimer, the term of this patent is extended or adjusted under 35 U.S.C. 154(b) by 229 days.

(21) Appl. No.: 14/655,019

(22) PCT Filed: Dec. 19, 2013

(86) PCT No.: PCT/FR2013/053180
§ 371 (c)(1),
(2) Date: Jun. 23, 2015

(87) PCT Pub. No.: WO2014/102487
PCT Pub. Date: Jul. 3, 2014

(65) Prior Publication Data
US 2015/0344650 A1 Dec. 3, 2015

(30) Foreign Application Priority Data
Dec. 27, 2012 (FR) ..................... 12 62826

(51) Int. Cl.
*C08J 7/04* (2006.01)
*C09D 5/00* (2006.01)
*C09D 133/12* (2006.01)
*C08J 3/24* (2006.01)
*B05D 3/14* (2006.01)

(52) U.S. Cl.
CPC .............. *C08J 7/047* (2013.01); *B05D 3/145* (2013.01); *C08J 3/245* (2013.01); *C08J 7/04* (2013.01); *C09D 5/002* (2013.01); *C09D 133/12* (2013.01); *C08J 2333/06* (2013.01); *C08J 2367/02* (2013.01); *C08J 2433/06* (2013.01); *C08J 2433/12* (2013.01); *C08J 2467/02* (2013.01); *Y10T 428/31797* (2015.04)

(58) Field of Classification Search
CPC ... C08J 7/04; C08J 7/047; C08J 3/245; C09D 5/002; C09D 133/12; B05D 3/145
USPC ................ 428/483; 427/407.1, 535; 524/513
See application file for complete search history.

(56) References Cited

U.S. PATENT DOCUMENTS

| 2,627,088 A | 2/1953 | Alles et al. | |
| 2,794,742 A | 6/1957 | Fowler, Jr. et al. | |
| 4,135,932 A * | 1/1979 | Mann | G03C 1/915 427/536 |
| 4,254,170 A * | 3/1981 | Roullet | B05D 7/02 215/12.2 |
| 4,310,600 A | 1/1982 | Cross | |
| 4,822,828 A * | 4/1989 | Swofford | B32B 17/1033 522/84 |
| 4,880,700 A * | 11/1989 | Charmot | C08J 7/047 428/337 |
| 5,466,535 A * | 11/1995 | Higgins | C08J 5/124 428/207 |
| 6,743,520 B2 * | 6/2004 | Street | B32B 27/36 428/355 AC |
| 8,137,788 B2 * | 3/2012 | Takada | C08J 7/047 428/141 |
| 8,466,535 B2 * | 6/2013 | Hopper | H01L 23/5256 257/503 |
| 2010/0081764 A1 * | 4/2010 | Ouzineb | C08F 2/22 524/767 |
| 2010/0093930 A1 * | 4/2010 | Guo | C08F 283/006 524/832 |
| 2011/0244206 A1 * | 10/2011 | Penache | B29B 9/02 428/220 |
| 2016/0312056 A1 * | 10/2016 | Ouzineb | C09D 133/10 |
| 2018/0072836 A1 * | 3/2018 | Nabuurs | C09D 153/00 |

FOREIGN PATENT DOCUMENTS

| EP | 0 260 203 A1 | 3/1988 |
| EP | 0 317 858 A2 | 5/1989 |
| EP | 0 400 801 A2 | 12/1990 |
| EP | 0 576 169 A2 | 12/1993 |
| FR | 1428831 A | 2/1966 |
| GB | 2 014 083 A | 8/1979 |
| JP | 10-000722 A | 1/1998 |
| JP | 11-227090 A | 8/1999 |
| JP | 2000-108285 A | 4/2000 |
| NL | 7 610 633 A | 3/1977 |
| WO | 96/19528 A1 | 6/1996 |

OTHER PUBLICATIONS

Feb. 25, 2014 Written Opinion issued in Application No. PCT/FR2013/053180.

(Continued)

*Primary Examiner* — Douglas J McGinty
(74) *Attorney, Agent, or Firm* — Oliff PLC (57) ABSTRACT

A method for coating a support with an adhesion primer for improving the connection between the support and an active outer layer. To this end, the coating of the support with a layer of adhesion primer is carried out with an aqueous dispersion including (i) particles of at least one acrylic and/or methacrylic polymer having either a gel content of less than 50 wt. % and an acrylic and/or methacrylic acid copolymer content of at least 10 wt. %, or a gel content of at least 50 wt. %, and (ii) at least one cross-linking agent in an aqueous solution, that can allow interfacial cross-linking and leads to a residual content of free acid functions of the surface copolymer(s) of at least 5 wt. %.

16 Claims, 4 Drawing Sheets

(56) References Cited

OTHER PUBLICATIONS

Feb. 25, 2014 International Search Report issued in Application No. PCT/FR2013/053180.

* cited by examiner

METHOD FOR COATING A SUPPORT WITH A DISPERSION BASED ON AN ACRYLIC POLYMER AND A CROSS-LINKING AGENT

FIELD OF THE INVENTION

The field of the invention is that of plastic films, in particular polyesters. The present invention relates to a novel method for coating a support, preferably a polyester film, with a coating intended to improve the bond between said support and an active outer layer (covering).

GENERAL CONSIDERATIONS

Technical Problem—Prior Art

Plastic films of the polyester type are well known for their excellent properties of thermal stability, dimensional stability, chemical resistance and relatively high surface energy. They are supports that are very strong and are particularly desirable for various film-forming coatings resulting in composite materials that find numerous applications: food or non-food packaging, support protection, films or sheets for graphic art (printing or drawing), metallized films. However, for high-stress applications, these supports have the drawback of insufficient adhesion of said film-forming coatings on the supports, in particular on polyester films, thus making their use ineffective and/or unreliable and therefore unsuitable. In fact, it is known that metallic coatings of PET film do not adhere properly to the film, especially under damp conditions and at high temperature, as is the case in processes for hot filling, pasteurization and sterilization. This lack or loss of adhesion means that the coating's expected barrier effect to oxygen and water vapour is lost, which causes deterioration of the food contents and a health risk.

In an attempt to solve this problem, several solutions have been proposed for improving the bond between the support and its covering. Thus, physical treatments (flame treatment, corona discharge, abrasive treatment) or physicochemical treatments (treatments with acid, grafting of chemical functions) on the surface of the films have been tested. As these various treatments have many drawbacks, the application of an intermediate coating has been preferred. This intermediate coating offers the advantage of good adhesion to the support and good adhesion to the final covering suitable for each particular use. It corresponds to a bonding primer coat and may be referred to as such hereinafter. A great many polymers or copolymers have been proposed for producing this primer coat. Patents U.S. Pat. No. 2,794,742, U.S. Pat. No. 2,627,088 FR 1 428 831 clearly state that the polymers that are the most suitable as bonding primer are acrylic polymers. This bonding or adhesion primer coat is put in place by coating with organic solutions or aqueous emulsions. However, although these acrylic polymers distinctly improve the adhesion of the final coverings to the polyester film support, this solution has the drawback that the acrylic primer coat must be adapted to each type of final covering and therefore to each use of the coated film for the best possible adhesion. This means that the manufacturer requires a range of different solutions. Therefore a primer has been sought that improves the adhesion of the final covering to its support that is as universal as possible, thus making it possible to eliminate the step of adaptation/modification of the composition of the primer to suit each type of final covering. Patent application EP 0 260 203 B1 aims to obtain such a universal bonding primer for polyester film. Said patent application describes a modified polymer obtained by aqueous phase radical polymerization of at least one monomer of an acrylic nature in the presence of an effective quantity of a water-dispersible polyester, derived from at least one aromatic dicarboxylic acid and at least one aliphatic diol and comprising a plurality of sulphonyloxy groups. The adhesion of final coverings applied on PET films coated with this adhesion primer (also called "latex" in said application EP 0 260 203 B1) was tested. Although the results for adhesion are good, they may nevertheless be improved.

Aims of the Invention

The invention aims to achieve at least one of the essential aims listed below. One of the essential aims of the present invention is to supply a support, preferably a polyester film, coated with a novel composition of bonding primer for a final covering giving distinctly improved results for adhesion between the support and the final covering.

Another essential aim of the present invention is to supply a coated and covered polyester film, offering enhanced barrier properties, in particular a barrier to oxygen and to steam.

Another essential aim of the present invention consists of supplying a novel metallizable and/or printable polyester film.

Another essential aim of the present invention consists of supplying a novel coated polyester film covered with a layer of metal and/or of metal oxide having enhanced adhesion properties between the support and the metal covering and enhanced barrier properties at high temperature and under damp conditions.

Another essential aim of the present invention consists of supplying a novel polyester film that is not water-sensitive.

Another essential aim of the present invention consists of supplying a novel method for coating a support, preferably a polyester film, with a bonding primer coat making it possible to obtain distinctly enhanced adhesion properties between the support and the final covering.

Another essential aim of the present invention consists of supplying a novel covering method of a polyester film coated with a bonding primer coat giving enhanced barrier properties and adhesion properties.

Another essential aim of the present invention consists of supplying novel uses of a support coated with the bonding primer and covered with a layer of metal and/or of metal oxide, or with a layer of ink, or a layer of adhesive, i.e. in particular packaging, preferably of foodstuffs, the decoration, printing and/or protection of various supports.

Another essential aim of the present invention is to supply a novel dispersion that is intended to be coated on a support that has received physical treatment beforehand or not, and to promote interfacial cross-linking for the purpose of improving the adhesion of a covering and the physical properties of the final support.

BRIEF DESCRIPTION OF THE INVENTION

These aims, among others, are achieved by the present invention, which relates, in a first aspect, to a method for coating a support with at least one coat of bonding primer, characterized by the implementation of the following steps:
 a) a support is implemented,
 b) optionally, a physical surface treatment of the corona or plasma type is carried out,
 c) at least one face of said support is coated with an aqueous dispersion comprising:

particles of acrylic and/or methacrylic polymer(s) having:
  either, on the one hand, a gel content below 50% by weight relative to the total weight of acrylic and/or methacrylic polymer(s) and, on the other hand, a content of copolymer(s) of acrylic and/or methacrylic acid(s) of at least 10% of the total weight of the polymers,
  or a gel content of at least 50% by weight relative to the total weight of acrylic and/or methacrylic polymer(s), and
at least one cross-linking agent, preferably in aqueous solution,
and the coating is made to cross-link in order to produce a primer coat allowing the bonding of a covering, the residual content of free acid functions of the copolymer(s) at the surface being at least 5% by weight relative to the total weight of polymer(s).

According to another of its aspects, the invention relates to a method for coating a support with at least one coat of bonding primer as described above and further comprising two steps of perpendicular stretching of the support, at least one step of which is carried out before or after steps b) or c), so as to obtain a two-dimensional final stretching.

According to another of its aspects, the invention relates to a method for coating a support with at least one coat of bonding primer as defined previously, characterized in that steps b) and c) are carried out in-line, i.e. the physical treatment and the application of the aqueous dispersion containing the particles of acrylic polymers and the cross-linking agent does not require withdrawing the film from the production line. The coating step takes place during the production of the coated film, preferably between the two steps of stretching of the film (cf. FIG. 6).

According to yet another of its aspects, the present invention relates to a method for coating a support as described above, in which the support in step a) is a polyester film, preferably of polyethylene terephthalate (PET), with a thickness A such that:
  A≤150 µm,
  preferably 4 µm≤A≤100 µm,
  more preferably 4 µm≤A≤40 µm,
  even more preferably 4 µm≤A≤12 µm.

According to another of its aspects, the present invention relates to a coating method as defined above, characterized in that the coat of bonding primer has a thickness E such that:
  E≤200 nm,
  preferably 40 nm≤E≤120 nm,
  more preferably 50 nm≤E≤100 nm,
  even more preferably 60 nm≤E≤90 nm.

According to another of its aspects, the present invention relates to a method for covering a support coated with at least one coat of bonding primer as obtained by the method as defined above, characterized in that it comprises a step of application of a covering capable of reacting with the bonding primer coat. This coating comprises:
  at least one layer of at least one metal and/or at least one metal oxide, or
  at least one layer of ink, or
  at least one layer of adhesive.

According to another of its aspects, the present invention relates to a covering method as defined above, characterized in that the covering consists of a layer of metal and/or of metal oxide, the metal (or metals) being selected from aluminium, copper, nickel, silver, gold, and alloys thereof, and the metal oxide(s) being selected from the oxides of aluminium, silicon, copper, nickel, silver and mixtures thereof.

According to another of its aspects, the present invention relates to a method for coating a support as defined below or for covering a coated support as defined above in which at least one portion of the surface of the support is modified by an electric discharge of the corona type under ambient air or gas.

According to another of its aspects, the present invention relates to a support obtained by the covering method as defined above comprising a step of application of a covering capable of reacting with the bonding primer coat and in which the covering comprises:
  at least one layer of at least one metal and/or at least one metal oxide, or
  at least one layer of ink, or
  at least one layer of adhesive,
said support being characterized by an adhesion of the covering of at least 200 gF/38 mm measured by the adhesion test AT defined below.

According to another of its aspects, the present invention relates to a support obtained by the method as defined previously and in which the covering consists of a layer of metal and/or of metal oxide, the metal (or metals) being selected from aluminium, copper, nickel, silver, gold, and alloys thereof, and the metal oxide(s) being selected from the oxides of aluminium, silicon, copper, nickel, silver and mixtures thereof, said support being characterized in that it has at least one of the following properties:
  an oxygen transmission rate at 23° C. and 50% moisture content at least less than 2 cc/m$^2$/d, preferably less than 1 cc/m$^2$/d, more preferably less than 0.5 cc/m$^2$/d, and/or
  a water vapour transmission rate at 38° C. and 90% moisture content at least less than 2 mg/m$^2$/d, preferably less than 1 mg/m$^2$/d, more preferably less than 0.5 mg/m$^2$/d.

According to yet another of its aspects, the present invention relates to an article selected from the group constituted by food and non-food packaging, films or sheets for graphic art (printing or drawing), films or sheets for decoration and films or sheets for support protection, characterized in that it comprises a coated and covered support as defined above or as obtained at the end of the covering method as defined above.

According to a final aspect, the invention relates to an aqueous dispersion, in particular for implementing the method as defined above, characterized in that it comprises:
  i) particles of acrylic and/or methacrylic polymer(s) having either, on the one hand, a gel content below 50% by weight relative to the total weight of acrylic and/or methacrylic polymer(s) and, on the other hand, a content of copolymer(s) of acrylic and/or methacrylic acid(s) of at least 10% of the total weight of the polymers, or a gel content of at least 50% by weight relative to the total weight of acrylic and/or methacrylic polymer(s), and
  ii) at least one cross-linking agent, suitable for allowing interfacial cross-linking of said particles of acrylic and/or methacrylic polymer(s), present in a quantity such that the interfacial cross-linking leads to a residual content of at least 5% by weight of free acid functions of the copolymer(s) at the surface relative to the total weight of polymer(s).

DETAILED DESCRIPTION OF THE INVENTION

The Support

The support for the coating method is a solid support. Quite particularly, a polyester film is used that is a product of polycondensation of one or more aromatic dicarboxylic acids (terephthalic acid, isophthalic acid for example) or of derivatives thereof (halides, esters) with at least one alkylene glycol (ethylene glycol; propane-1,3-diol; butane-1,4-diol for example). Preferably, they are polyesters derived from terephthalic acid or from a mixture of terephthalic acid and another aromatic dicarboxylic acid (isophthalic acid for example), the terephthalic acid content of the mixture being sufficient so that the polymer is essentially crystalline after stretching.

Preferably, for the implementation of the invention, film-forming linear polyesters, crystallizable by orientation, are used, and obtained in standard fashion starting from one or more aromatic dicarboxylic acids or derivatives thereof (esters of lower aliphatic alcohols or halides for example) and from one or more aliphatic diols (glycols).

The polyester constituting the base film may be selected from the polyesters that are usually used for obtaining bi-oriented semicrystalline films. As examples of aromatic acids, mention may be made of the phthalic, terephthalic, isophthalic, naphthalene-2,5-dicarboxylic, and naphthalene-2,6-dicarboxylic acids. These acids may be combined with a minor quantity of one or more aliphatic or cycloaliphatic dicarboxylic acids, such as the adipic, azelaic, tetra- or hexahydroterephthalic acids.

As non-limitative examples of aliphatic diols, mention may be made of ethylene glycol, propane-1,3-diol and butane-1,4-diol. These diols may be combined with a minor quantity of one or more aliphatic diols of more condensed carbon (neopentylglycol for example) or cycloaliphatic diols (cyclohexanedimethanol for example).

Preferably, the crystallizable film-forming polyesters are polyterephfhalates or alkylenediol polynaphthalenedicarboxylates and, in particular, polyethylene terephthalate of ethylene glycol (PET) or of butane-1,4-diol or copolyesters comprising at least 80 mole percent of ethylene glycol terephthalate units. Advantageously, the polyester is a poly (ethylene terephthalate) glycol the intrinsic viscosity of which measured at 25° C. in ortho-chlorophenol is between 0.6 dl/g and 0.75 dl/g.

The bi-oriented polyester films are for example;
either constituted by polyethylene terephthalate;
or constituted by mixtures, or not, of polyethylene terephthalate copolyesters containing cyclohexyl dimethylol units in place of the ethylene units;
or composed of mixtures, or not, of polyethylene terephthalate copolyesters with a proportion of polyester having isophthalate units;
or constituted by several layers of polyesters of different chemical natures, as described previously, obtained by coextrusion, Specific examples of aromatic polyesters are in particular polyethylene terephthalate (PET), polyethylene isophthalate, polybutylene terephthalate, poly(dimethyl-1,4-cyclohexyleneterephthalate) and polyethylene-2,6-naphthalenedicarboxylate. The aromatic polyester may be a copolymer of these polymers or a mixture of these polymers with a small quantity of other resins, a non-limitative example being polybutylene terephthalate (PBT). Among these polyesters, polyethylene terephthalate (PET) and polyethylene-2,6-naphthalenedicarboxylate (PEN) are particularly preferred as they offer a good balance between the physical properties, the mechanical properties and the optical properties. Preferably, the content of terephthalic acid, expressed in moles per hundred moles of acid, is at least 80. In the preferred embodiments of the invention, the support is a film of polyethylene terephthalate PET (for example bi-axially oriented) or polyethylene naphthalate (PEN) or polybutylene terephthalate (PBT).

The support films implemented in the present invention may be oriented or not. Preferably, they are oriented. Advantageously, the polyester film used is bi-axially oriented.

The support according to the invention may be mono-layer, bi-layer or tri-layer. Each of the layers is composed of polyesters as defined above, preferably of PET, PBT or PEN, and/or of the copolyesters described above and/or of mixtures of polyesters/copolyesters. The layer or layers may be of a structure M, MN, MNM or MNO, where M is different from N and O, N is different from O. The main layer may be sandwiched between one or two layers, identical or not in terms of thickness and/or of composition. In this structure, the support may be symmetric or asymmetric. One of these layers of the support may increase the adhesion of the future coating described below.

The support implemented for the present invention is preferably a polyester film, more preferably a film of polyethylene terephthalate (PET), with a thickness A such that:
A≤150 μm (micrometers),
preferably 4 μm≤A≤100 μm,
more preferably 4 μm≤A≤40 μm,
even more preferably 4 μm≤A≤12 μm.

The support according to the invention may advantageously partly comprise recycled product originating from the support itself and/or from the coated support and/or from the coated and covered support. The support may contain up to 80% by weight of this recycled product relative to the total weight of the final support. This makes it possible to reduce the costs of production of the film and avoid economic losses due to the non-use of scraps of support, of coated support and/or of coated and covered support.

The Coating

The support of the invention as defined above is coated with an aqueous dispersion comprising:
particles of acrylic and/or methacrylic polymer(s) having:
either—a gel content below 50% by weight relative to the total weight of acrylic and/or methacrylic polymer(s), and
a content of copolymer(s) of acrylic and/or methacrylic acid(s) of at least 10% of the total weight of the polymers,
or: a gel content of at least 50% by weight relative to the total weight of acrylic and/or methacrylic polymer(s), and
at least one cross-linking agent.

The present invention also relates to this coating composed of said dispersion made of acrylic and/or methacrylic polymers, as well as at least one cross-linking agent.

The Acrylic and/or Methacrylic Polymers

In the present invention, the aqueous dispersion comprises particles of acrylic and/or methacrylic polymer(s). These polymer particles are constituted by monomers. The polymer particles may comprise hydrophobic monomers, hydrophilic monomers and partially hydrophilic monomers.

Preferably, the monomers used for the synthesis of the acrylic and/or methacrylic polymers usable for the present coating are as follows:

(i) hydrophobic monomer(s) which is (are) a mixture of at least one alkyl acrylate or alkyl methacrylate, where the alkyl moiety is linear or branched and contains at least 4 carbon atoms;
(ii) at least 5% of hydrophilic monomer(s)
(iii) at least 5% of partially hydrophilic monomer(s) selected from the alkyl acrylates or alkyl methacrylates, in which the alkyl moiety has 1 or 2 carbon atoms.

The percentages by weight of monomers (i), (ii) and (iii) are based on the total weight of monomers.

The hydrophilic monomers that may be used in the present invention are monomers that are copolymerizable with hydrophobic monomers and are water-soluble. The hydrophilic monomers are selected from mono-olefinic monocarboxylic acids, mono-olefinic dicarboxylic acids and mixtures thereof. Examples of hydrophilic monomers include, but are not limited to, acrylic acid, methacrylic acid, fumaric acid, maleic acid, itaconic acid, crotonic acid, an oligomer of acrylic acid and mixtures thereof. The acids preferred are acrylic acid, methacrylic acid and mixtures thereof.

The quantity of hydrophilic monomers based on the total quantity of monomers (i), (ii) and (iii) is at least of 5% by weight, preferably greater than 10% by weight.

The partially hydrophilic monomers that may be used for the present invention include the alkyl acrylates or alkyl methacrylates, in which the alkyl moiety has 1 or 2 carbon atoms. Examples of partially hydrophilic monomers include, but are not limited to, methyl acrylate, methyl methacrylate, ethyl acrylate, N-vinyl-2-pyrrolidone, and mixtures thereof. The partially hydrophilic monomers that are preferred are methyl acrylate, methyl methacrylate, ethyl acrylate, and mixtures thereof, methyl methacrylate and ethyl acrylate being the most preferred.

The quantity of partially hydrophilic monomers based on the total quantity of monomers (i), (ii) and (iii) is at least 30% by weight, preferably from 40 to 60% by weight, more preferably from 50 to 60% by weight.

Advantageously, it is possible for the acrylic and/or methacrylic particles not to contain monomers of the acrylamide type, of the aromatic dicarboxylic acid or ester type (in particular phthalic, isophthalic and terephthalic acid and the corresponding esters), of the styrene type, of the alkylphenol type or of the butadiene type. These monomers are preferably excluded from food applications.

The total weight of hydrophobic, hydrophilic and partially hydrophilic monomers described above preferably represents at least 60%, more preferably at least 75%, more preferably at least 80%, and even more preferably at least 90% of the total weight of monomers constituting the acrylic and/or methacrylic particles according to the invention. The percentage by mass of monomers different from these hydrophobic, hydrophilic and partially hydrophilic monomers is preferably below 20%, more preferably below 10%, and even more preferably below 5%, relative to the total weight of the monomers. Preferably, the particles of acrylic and/or methacrylic polymer(s) according to the invention are essentially constituted by the hydrophobic, hydrophilic and partially hydrophilic monomers described above. According to a preferred embodiment, the particles of acrylic and/or methacrylic polymer(s) according to the invention are constituted by the hydrophobic, hydrophilic and partially hydrophilic monomers described above.

The gel content of the particles of acrylic and/or methacrylic polymers is measured using a Soxhlet extractor with the following technique:

1 g of acrylic and/or methacrylic polymer is put in a cellulose capsule that has been weighed beforehand. A flask is filled with 100 ml of tetrahydrofuran solvent (THF) and is left under a nitrogen atmosphere. The system is heated to 95° C. using an oil bath. At 95° C., the nitrogen flow rate is reduced and sheets of aluminium are fitted round the glass column to keep it hot and prevent condensation of THF on the walls. Extraction starts when the THF evaporates and when it falls into the capsule, solubilizing the acrylic and/or methacrylic polymer, which is not cross-linked. Extraction takes 7 hours. Then the capsule is dried at 105° C. overnight.

The measurement of the gel content (G) is calculated with the following equation:

$$G(\%)=[(Mf-Mc)\times 100]/Mi$$

in which
Mf is the final mass, i.e. after drying, of the capsule and of the insoluble polymer,
Mc is the mass of the capsule, and
Mi is the mass of the dried polymer.

The content of copolymer(s) of acrylic and/or methacrylic acid(s) as a function of the total weight of the polymers is based on the weight ratio between the quantity of acrylic and/or methacrylic acid monomer introduced and the total quantity of monomer.

Hereinafter, for simplicity and by convention, "latex" will denote indiscriminately the particles of acrylic and/or methacrylic polymer(s) having either a gel content below 50% by weight relative to the total weight of acrylic and/or methacrylic polymer(s), and a content of copolymer(s) of acrylic and/or methacrylic acid(s) of at least 10% of the total weight of the polymers, or a gel content of at least 50% by weight relative to the total weight of acrylic and/or methacrylic polymer(s), or an aqueous dispersion of these particles.

In a preferred variant embodiment of the invention, the particles of acrylic and/or methacrylic polymers are such that:
their gel content is below 40%, more preferably below 30%, even more preferably below 20%, quite particularly preferably below 10% by weight relative to the total weight of acrylic and/or methacrylic polymer(s), and
the content of copolymers of acrylic and/or methacrylic acid(s) is above 5%, more preferably above 10% of the total weight of the polymers and even more preferably above 15%.

In a variant embodiment, the particles of acrylic and/or methacrylic polymers are such that their gel content, after cross-linking on the support formed, is greater than or equal to 60%, more preferably greater than or equal to 70%, even more preferably greater than or equal to 80%, quite particularly preferably greater than or equal to 90% by weight relative to the total weight of acrylic and/or methacrylic polymer(s).

The Cross-Linking Agent

In the present invention, the aqueous dispersion further comprises at least one cross-linking agent. This cross-linking agent is suitable for allowing interfacial cross-linking of the particles of acrylic and/or methacrylic polymers. It leads after cross-linking to a coating layer having a residual content of free acid functions of the copolymer(s) of acrylic and/or methacrylic acid(s) at the surface of at least 5% by weight relative to the total weight of polymers(s). The cross-linking agent thus makes it possible to produce a primer coat allowing the bonding of a coating.

Figure 4:
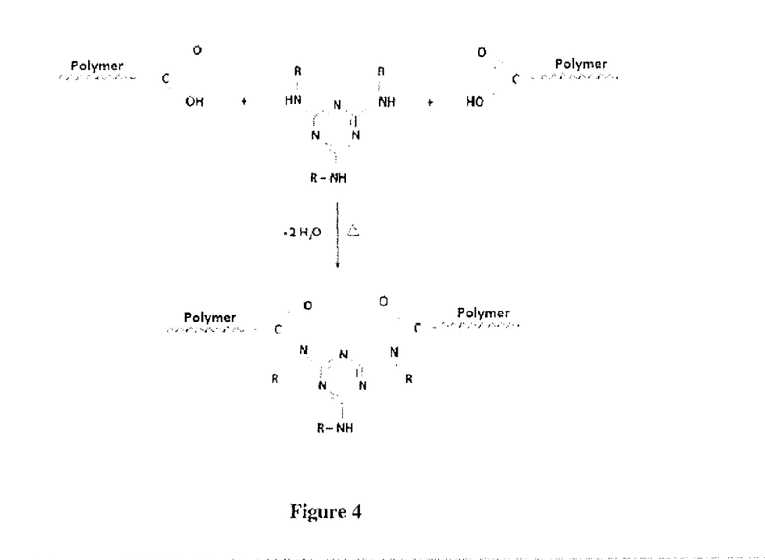
FIG. 4 shows a scheme of the interfacial cross-linking of carboxyl groups sited at the interface of polymer particles with a cross-linking agent of the melamine-formol type.

By cross-linking agent is meant an additive that is added to the aqueous dispersion of acrylic and/or methacrylic polymer and generates, during the drying step, a cross-linking reaction with the hydroxyl or carboxylic functions of the acrylic copolymer (see FIG. 4). This cross-linking agent thus gives rise to the formation of one or more three-dimensional networks between the polymer chains.

The residual content of free acid functions of the copolymer(s) of acrylic and/or methacrylic acid(s) at the surface is calculated with the following method of conductometric determination:

The main aim of the conductometric determinations is to evaluate the quantity of charges present at the surface of the particles, said charges generally being supplied in order to functionalize the latexes. There are two types of charge: "strong acid" charges and "weak acid" charges. The "strong acid" charges are the sulphate $SO_4$ originating from the initiator of radical polymerization, for example ammonium persulphate. The "weak acid" charges are the carboxylic $COO^-$ charges supplied by the acrylic and/or methacrylic acid. Conductometric determination is carried out on a latex washed beforehand, the solids content of which is accurately known. The crude latex is diluted to reach a solids content below 5%. This diluted latex is then washed on mixed ion-exchange resins, i.e. anionic and cationic. At the end of this step, the counter-ions of the positive charges are hydroxyl ions and those of the negative charges are protons. This treatment makes it possible to remove the ionic species that are not grafted to the surface of the particles (charges derived from the initiator or molecules of surfactant, free or weakly adsorbed at the surface of the particles). Determination consists of determining the neutralization minima of the acid functions using a conductometric probe and takes place in two steps. The first step consists of determining the strong acid charges ($SO_4^-$) by adding sodium hydroxide solution. Once neutralization of these charges has ended, an excess of sodium hydroxide is added, in order to convert the carboxylic acid functions present at the surface into carboxylate ions. The carboxylic charges are not in fact directly detectable with sodium hydroxide, owing to their low $pK_A$. The second step then consists of determining the latex in return with hydrochloric acid: firstly the excess hydroxyl ions $OH^-$ are neutralized, then the weak acid charges $COO^-$. The diluted latex is brought into contact with the resin and stirred for 30 to 40 minutes. It is then filtered on quartz wool to remove the resin and its conductivity is measured. The operation is repeated as many times as necessary, until the conductivity is constant. The successive washings are in fact accompanied by a decrease in conductivity and washing is regarded as ended when the conductivity stabilizes. The solids content of the washed latex is then determined accurately, as the successive washings tend to dilute the latex. In addition, the granulometry of the washed latex is verified, to make sure that it has not changed during the washings. A certain quantity of latex is weighed accurately and diluted in 50 mL of demineralized water. The mixture is stirred and degassed for 10 minutes with a nitrogen stream, in order to remove all traces of carbon dioxide dissolved in the water, which could distort the determination by causing the release of carboxylic functions. Scavenging with nitrogen is also maintained during the determinations. A preliminary determination makes it possible to evaluate the quantity of latex to use, taking into account the concentration of the titrating solutions (i.e. $\sim 10^{-2}$ mol·L$^{-1}$), to obtain the greatest accuracy. Three determinations are then carried out to check the reliability of the results. The determinations are monitored with a conductivity meter equipped with a platinum electrode connected to a central acquisition unit. Based on the determination curves, it is then possible to calculate the concentration of the charges in the latex from the following equations:

$$C_{charges \cdot strong \cdot acid} = \frac{[NaOH] \times V_{NaOH}}{m_{latex} \times TS} \times 10^3$$

$$C_{charges \cdot weak \cdot acid} = \frac{[HCl] \times V_{HCl}}{m_{latex} \times TS} \times 10^3$$

in which $C_{charges}$ denotes the concentration of the charges in the latex, expressed in microequivalent per gram of polymer (µeq/gpolymer),

[NaOH] and [HCl] represent respectively the concentration of sodium hydroxide and hydrochloric acid in the titrating solutions, expressed in mol·L$^{-1}$, $V_{NaOH}$ and $V_{HCl}$ represent respectively the volume of titrating solutions of sodium hydroxide and hydrochloric acid used for the determination, expressed in liters, $m_{latex}$ represents the weight of latex, expressed in grams, and TS represents the solids content in the diluted latex.

In latexes having a gel content below 50% by weight relative to the total weight of acrylic and/or methacrylic polymer(s), but having a content of copolymers of acrylic and/or methacrylic acids of at least 10% of the total weight of the polymers (sometimes called latex A hereinafter), the cross-linking agent will allow two types of cross-linking: intramolecular and interfacial, the latter will make it possible to leave sufficient polarity at the surface of the coated film formed to allow good adhesion of the covering that it is intended to receive.

Latexes the gel content of which is at least 50% by weight relative to the total weight of acrylic and/or methacrylic polymer(s) are latexes that are already highly cross-linked (sometimes called latex B hereinafter) and the cross-linking agent that is added does not allow intramolecular cross-linking, it will allow interfacial cross-linking and will be used especially as an agent for polarizing the surface of the film formed by the acrylic and/or methacrylic particles.

The preferred proportions of particles/cross-linking agent are 90/10 (weight/weight), more preferably 80/20.

The following cross-linking agents are suitable for carrying out the present invention but the invention is not limited thereto. The cross-linking agents may be amine-based resins, in particular melamine aldehydes. The amine-based resins are complex mixtures with various functional sites and molecular species synthesized by the condensation of formaldehyde with an amine and subsequent alkylation of the resultant methylol groups with an alcohol.

Certain cross-linking agents used are melamine aldehyde resins with the following general formula:

where

R$_1$ to R$_6$ is selected respectively from —H, —CH$_2$OOH, —CH$_2$OR$_7$, R$_7$ being a C$_1$ to C$_5$ alkyl group.

The best performance is obtained with cross-linking agents having at least one of the following properties:
- a partially methylated or better still strongly methylated amine-based resin,
- rapid hardening at a temperature above 80° C.,
- good compatibility with the water-soluble acrylic polymers, such as latex having a gel content below 50% by weight relative to the total weight of acrylic and/or methacrylic polymer(s), and a content of copolymers of acrylic and/or methacrylic acid(s) of at least 10% of the total weight of the polymers (for example latex A),
- stability in long-term storage when mixed with the water-based acrylic polymer (more than 48 h).

The amine-based resins preferably used for implementing the present invention are quite particularly Cymel 1123® (a methylated and ethylated benzoguanamine-formaldehyde resin, 98% minimum solids) and Cymel 303LF® (a methylated melamine-formaldehyde resin having reactive alkoxy groups, 98% minimum solids), the respective chemical structures of which are given below:

Cymel 1123 in which R may be CH$_3$ or C$_2$H$_5$

Cymel 303

These resins are marketed by Cytec Industries Inc.

The melamine aldehyde resin and the available carboxyl, hydroxyl, amide and/or methylol groups of the acrylic and/or methacrylic polymers can react in the presence of an acid catalyst. The acid catalyst may be blocked or not. As an acid catalyst suitable for the implementation of the present invention, mention may be made of, without being limited thereto, the mineral acids, p-toluenesulphonic acid, dinonylnaphthalene disulphonic acid, dodecylbenzenesulphonic acid, oxalic acid, maleic acid, hexamic acid, phosphoric acid, phthalic acid, acrylic acid copolymerized in the polymer. The catalyst most commonly used is para-toluenesulphonic acid. The optimum quantity of catalyst depends on the target acidity of the acrylic latex and the target curing temperature.

These cross-linking agents show good reactivity starting from a temperature above 140° C. The cross-linking agents of the melamine-formol type have a minimum activation temperature above 100° C., which is suitable for the method according to the invention and also corresponds to the drying temperature of water (evaporation) and therefore to the formation of the cross-linked coating.

In a variant embodiment, provision may be made for the addition to the coating of mineral fillers or organic or inorganic particles in dispersion in water, the purpose of which is to control the slipperiness of the support after coating. It is possible for the coating according to the invention to contain functional additives as well. Preferably, however, the coating according to the invention does not contain an adhesion promoter, for example citrates, adipates or epoxidized vegetable oils.

The coating, also called bonding primer coat, has a thickness E such that:

E≤200 nm (nanometers),
preferably 40 nm≤E≤120 nm,
more preferably 50 nm≤E≤100 nm,
even more preferably 60 nm≤E≤90 nm.

The thickness of the primer coat may be controlled by any suitable means as described below.

The latexes used for carrying out the present invention preferably have a small particle size (dp<100 nm) and consequently the particulate surface area is very high.

The cross-linking agent, which is a source of polarity necessary for interaction with the future covering, is located at the surface of the particles, which therefore represent a very large surface area per m$^2$ of support. This contributes to an increase in the number of possible sites of interaction with the molecules of the covering (for example metal or a metal oxide) and therefore promotes adhesion of the covering at the interface of the coating.

The optimum coating thickness is about 80 nm±20 nm, which corresponds to 0.08 g/m$^2$ of support.

The total surface area S represented by the quantity of coating can be calculated as follows:

$$S = N_p \times S_{1p}$$
$$N_p = \frac{V_{polymer}}{V_{1p}} = \frac{m_p}{V_{1p}} \times d$$

in which:
$N_p$=number of polymer particles
$S_{1p}$=surface area of a particle in m$^2$
$V_{polymer}$=volume of polymer particles in m$^3$
$V_{1p}$=volume of a particle in m$^3$
$m_p$=mass of a polymer particle in g
d=polymer density (=1 g/cm$^3$ for the acrylic copolymer)
$d_p$=diameter of the polymer particle in m.

For a given coating thickness (80 nm) and a given diameter of polymer particle ($d_p$=80 nm), the total surface area of the polymer particles S for one square meter of coated PET support is $$S=1500 \text{ m}^2$$

assuming that the polymer particles are spherical $$\left( \text{i.e. } V_{1p} = \frac{4}{3} \times \pi \times r_p^3 \text{ and that } S_{1p} = \pi \times r_p^2 \right).$$

The Coated Support

For simplicity, the coated support corresponds to the support as described above, preferably a polyester film, on which has been applied and cross-linked the coating constituted by the aqueous dispersion as defined above, to which a cross-linking agent is added.

The optimum performance is obtained with a formulation of acrylic latexes having at least one of the following characteristics, preferably a combination of at least two of these characteristics:
- an aqueous dispersion comprising particles of acrylic and/or methacrylic polymer(s) and having a gel content of at least 50% by weight relative to the total weight of acrylic and/or methacrylic polymer(s),
- a minimum temperature of film formation between 10° C. and 50° C. (or a film forming at ambient temperature),
- particle size less than 100 nm,
- interfacial cross-linking with a cross-linking agent having amine functionalities such as melamine.

The support (polyester film) coated with said coating is intended to receive a given covering depending on the desired applications.

The Covering

Various applications are envisaged for the final support, namely the support coated with the dispersion as described above and cross-linked by means of the cross-linking agent described above, and covered. The applications envisaged depend on the covering itself.

The covering is able to react with the bonding primer coat according to the invention. This reaction takes place via the free acid functions of the copolymer or residual polarity at the surface of the coated support. The presence of this polarity (COOH groups, or even OH) allows possible interaction between the coating and the covering and leads to better fixation of the latter to the support.

The covering comprises:
- at least one layer of at least one metal and/or at least one metal oxide, or
- at least one layer of ink, or
- at least one layer of adhesive.

In quite specific cases, combining these various types of coverings may be envisaged.

By covered coated support is meant the support as described above, with or without physical treatment of the corona or plasma type, to which a coating as defined above has been applied and cross-linked, and on which a covering as defined above has been applied.

When the covering consists of a layer of at least one metal and/or at least one metal oxide, the metal used for the covering may be selected from aluminium, copper, nickel, silver, gold, and alloys thereof, and the metal oxide(s) is(are) selected from the oxides of aluminium, silicon, copper, nickel, silver and mixtures thereof. Covering the coated support with zinc sulphide may also be envisaged.

The ink used for the covering is conventional and is known to a person skilled in the art. It may be selected from various types of inks, with particular features depending on the method of drying (absorption, oxidative polymerization, solvent evaporation, polymerization under UV radiation). The printing techniques commonly used for plastic films are heliogravure, flexography and offset. The copolyester component of the coating, having more affinity for PET, will promote primer/film adhesion, whereas the acrylate copolymer component, having more affinity for the inks (often acrylate based), will promote primer/ink adhesion.

The adhesive used for the covering is conventional and is known to a person skilled in the art. In particular, the commercial products are used the applications of which are identical to those considered in the present application.

The coated and covered support according to the invention offers very strong adhesion of the covering and very good barrier properties, especially to oxygen and steam, under conditions of high temperature and humidity. The conditions for hot filling or packaging, for example of food products such as tomato sauce (cf. the examples below) are conditions under high temperature and damp conditions.

The Method of Coating and of Manufacture of the Coated Support

In order to obtain increased adhesion of the subsequent covering of the support under damp and dry conditions, a chemical treatment (after a physical treatment of the corona or plasma type or not) was applied to the support before the covering step. This chemical treatment is a coating of at least one coat of bonding primer or adhesion primer.

The support is coated with at least one coat of bonding primer according to the method comprising the following steps:
a) a support is supplied,
b) optionally, a physical surface treatment of the corona or plasma type is carried out,
c) at least one face of said support is coated with an aqueous dispersion comprising:
  particles of acrylic and/or methacrylic polymer(s), and having:
    either, on the one hand, a gel content below 50% by weight relative to the total weight of acrylic and/or methacrylic polymer(s) and, on the other hand, a content of copolymer(s) of acrylic and/or methacrylic acid(s) of at least 10% of the total weight of the polymers,
    or a gel content of at least 50% by weight relative to the total weight of acrylic and/or methacrylic polymer(s),
  and
    at least one cross-linking agent, preferably in aqueous solution, and the coating is made to cross-link in order to produce a primer coat allowing the bonding of a covering, the residual content of free acid functions of the polymer(s) at the surface being at least 5% by weight relative to the total weight of polymer(s).

The support used is as defined above. Preferably, it is a PET film.

For further improvement of the adhesion properties of the covering on the coated support, it can be envisaged that at least a portion of the surface of film according to the invention is subjected to a treatment by electric discharge of the corona type and/or to a treatment of the plasma type. This treatment is carried out before coating (step c).

Said treatment of the corona type is a corona discharge under ambient air at atmospheric pressure or under gases at high partial pressures, preferably between 100 mbar and 3000 mbar, even more preferably at atmospheric pressure.

Deposition of this bonding primer coat on the polyester film, preferably PET, may be carried out by the various techniques known to a person skilled in the art. Thus, a dispersion of acrylic and/or methacrylic polymer(s) with a cross-linking agent may be deposited by gravity from a slot-orifice coater, or by passing the film through the dispersion, by means of transfer rollers, by in-line coating with an reverse gravure process.

Preferably, coating of the support, according to the present invention, is carried out in-line, which not only allows simplification of industrial implementation but also a considerable saving of time and money.

The thickness of the coating is a function of the kinetics of cross-linking of the latter. It depends in particular on the dry extract of the dispersion used, the percentage of cross-linking agent included in the dispersion and the conditions of drying of the coating. Of course, the thickness also depends on the quantity of coating deposited.

Coating of the support is carried out on at least one face of the support. It may of course be carried out on both faces of the support.

The support is preferably stretchable. Preferably, it undergoes stretching in one or two perpendicular directions. When it is stretched in two directions, this is called two-dimensional stretching, which may be firstly longitudinal (Longitudinal Stretching LS, LS ratio ≥3.0) followed by transverse stretching (Transverse Stretching TS, TS ratio ≥3.5). The planar stretching ratio (defined as the product of the longitudinal stretching ratio and the transverse stretching ratio, regardless of the order of carrying them out) is for example between 1 and 20, usually greater than 12.

The stretching sequences may be different depending on the machines used, without affecting the properties obtained by means of the invention. For example, so-called inverse-sequence machines or multistep machines, machines with alternating sequences or machines with simultaneous stretching, etc., may usefully be used.

The stretching temperature is for example comprised between the glass transition temperature Tg and a temperature at most equal to Tg+60° C. in the longitudinal direction as well as in the transverse direction.

Longitudinal stretching is carried out for example by 3 to 6 times and transverse stretching for example by 3 to 5 times.

In general, following the stretching operation or operations, the film undergoes a step of thermosetting. As an example, for PET, thermosetting is carried out between 180° C. and 250° C. (for example at 240° C.) for 1 to 60 seconds for example and then at a lower temperature in order to stabilize the film.

Deposition of the primer coat by coating may take place before any stretching of the support, between the two steps of stretching of the support or after the two steps of stretching, the latter option being less satisfactory. Preferably, the bonding primer is coated between the two steps of stretching.

After deposition of the coating, cross-linking takes place to form a bonding primer coat. The cross-linking may take place naturally after deposition of the coating or may be caused by drying of the coating, intended to remove the water from the aqueous dispersion. However, in the case of in-line coating, it is not generally necessary to proceed to a specific drying step: drying is carried out during the steps of stretching and/or thermosetting. However, it can also be envisaged in the present invention to implement a drying step by thermal treatment prior to stretching and/or thermosetting.

The presence of the cross-linking agent is intended to provide a polarity to the surface of the film. This polarity (COOH, OH groups) allows favourable interactions between the covering and the surface of the film. However, these polarities also generate water sensitivity as support coatings rich in acid functions tend to absorb water easily, so that under damp conditions, the bonds created between the covering and the support are lost. The alternative was therefore to activate the cross-linking reaction during formation of the film or during drying thereof. Step c) therefore also aims to increase the cross-linking of the film during formation or drying of the latter.

The film obtained at the end of the coating process has reduced water sensitivity.

In a variant embodiment of the present invention, the acrylic latex (particles of acrylic and/or methacrylic polymers) is made from a copolymer containing 1 to 60% by total weight of acrylic and/or methacrylic monomers and 1 to 15% of copolymers of acrylic and/or methacrylic acids.

The coating method is such that the bonding primer layer coated on the support has a thickness E as defined above.

The thickness of the adhesion primer coat or of the support coated with the adhesion primer coat was measured by the TOF-SIMS (Time of Flight-Secondary Ion Mass Spectrometry) method, in which 2 types of measurements were carried out.

1. A profile of the qualitative distribution in depth of the surface of the film and as far as the core of the PET substrate on PET films under various conditions. This makes it possible to estimate the thickness of the bonding primer coat during erosion and perform a comparative analysis between different films of the same kind.
2. A measurement of the thickness of the film by profilometer reading of a crater obtained on a reference film (with stopping of ionic erosion after removal of the covering), and calculation of the erosion rate from the corresponding erosion time for removing it.

Starting from measurement No. 2, a correlation can be established between erosion time/erosion rate and the thickness. Thus, the thickness can be estimated on all of the films for which an erosion time has been measured (measurement No. 1).

The surface analysed is 100 µm×100 µm at the centre of the larger erosion crater (about 600 µm×600 µm), to minimize the edge effects and effects of re-deposition. Each point of the profiles is obtained from a mass spectrum, which allows elemental analysis throughout the depth probed. Thus, each element or contaminant present at the surface, at the core of the layers and at the interfaces is automatically detected.

The following major elements are detected indiscriminately in the film (bonding primer coat) and in the PET: carbon (C) and oxygen (O). In the bonding primer coat, traces of sulphur (S) are detected. The ionic species adopted for the distribution in depth profiles are therefore the following elements: C, O, and S.

The Coating Method

The support coated with at least one coat of bonding primer as obtained by the method defined above is produced by a method comprising a step of application of a covering capable of reacting with the bonding primer coat. The covering in question may be:
  at least one layer of at least one metal and/or at least one metal oxide, or
  at least one layer of ink, or
  at least one layer of adhesive.

The presence of strong acids at the interface, supplied by the comonomer such as the acrylic and/or methacrylic acid of the bonding primer, allows favourable interaction of the coating of acrylic copolymer with the particles of the future covering, for example the particles of metal during the step of metallizing of the coated film. The higher the polarity at the surface of the film, the stronger is the adhesion of the covering, regardless of the type of covering.

The covering may be made on the coating that is present on one or both faces of the support.

With respect to a metallizing of the coated support, this is carried out under vacuum. It consists of vaporizing under vacuum ($4\times10^4$ mbar) a thin metallic layer (typically aluminium) on the film. Evaporation is carried out in ceramic crucibles heated by the Joule effect (1400° C. to 1500° C.). The metal is then sprayed onto the surface of the film which is in contact with a cooled roller called a coating roller. It then condenses immediately, thus forming a thin layer from 20 nm to 100 nm. During metallizing, the thickness of the layer of metal is monitored by measuring the optical density (OD, measurement of the transparency of the film).

Metallizing is carried out either with at least one metal selected from aluminium, copper, nickel, silver, gold, and alloys thereof, or at least one metal oxide selected from the oxides of aluminium, silicon, copper, nickel and silver, or with one of the mixtures thereof.

With respect to the application of a covering of ink and adhesive, this is carried out according to the methods known to a person skilled in the art, in particular printing/complexing.

It was discovered, surprisingly, that the cross-linking reaction, which takes place mainly at the interface, allowed clearly increased adhesion of the covering to be obtained, especially under damp conditions. Interfacial cross-linking is generally used for generating networks of heterogeneous polymers: region of hard and soft polymers (core-shell) in order to obtain a good balance between the cohesive and adhesive properties. The challenge in the present invention was to produce a cohesive polymer (having a high cross-link density) but also having polar functionalities allowing good interaction with the covering, in particular with the metal and/or metal oxide, and consequently strong adhesion at the covering (preferably metal)/coated film (preferably PET) interface.

The Properties of the Coated and Covered Support

Adhesion

The coated and covered support obtained by the method described above gives adhesion of the covering of at least 200 gF/38 mm measured by the adhesion test AT detailed below.

Under dry conditions, the adhesion of the covering is good and is at least 1000 gF/38 mm. However, under damp conditions, the adhesion properties of the covering are often degraded but the properties of the support coated and covered according to the present invention under these conditions are of at least 200 gF/38 mm measured by the adhesion test at (see FIGS. 2, 3 and 5).

The adhesion test AT is measured according to the AIM-CAL TP-105-92 recommendations (Metallizing Technical Reference published by the Association of Industrial Metallizers, Coaters and Laminators). It is described for metal but it is suitable for the other types of covering intended to be applied on the coated support according to the invention.

Figure 7:
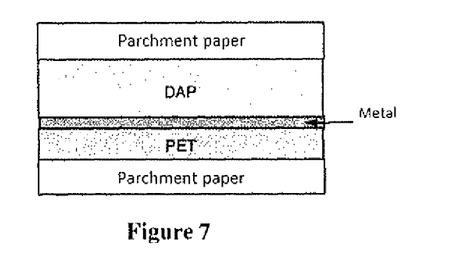
Figure 8:
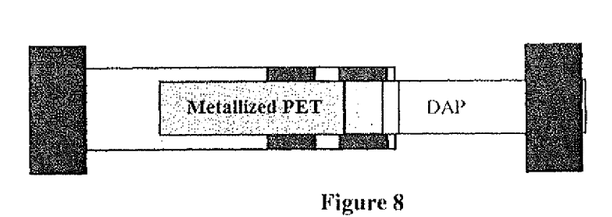

The AT test allows the adhesive strength between metal and PET to be measured, using a dynamometer. This test is carried out under dry and damp conditions. The metallized PET film is sealed with a treated polyethylene film (DAP). A test specimen with a width of 38 mm is then cut out of the sample and will be used for the measurement. The complex formed is shown in FIG. 7. The test specimen is tested under tension using an INSTRON dynamometer in order to determine the force to be applied to detach the layer of aluminium from the coated film. The PET film is fixed in the lower jaws and the DAP film is fixed in the upper jaws (FIG. 8). In this way, tension is exerted at 180° at a velocity of 100 mm/min on the sealed zone and the force required for delamination is measured (according to standard NF T 54-122, "Assessment of the quality of a weld or bond between two sheet elements by means of a tensile test"). The result of this AT test is an adhesive strength expressed in gF/38 mm. For each sample, a minimum of 3 test specimens is tested in this way, and each film is cut into six wide strips, the optical density of which is measured to ascertain the quantity of metal deposited. The force required at the dynamometer for detaching the layer of metal from the PET film under dry and damp conditions is measured. The difficulty is to maintain the forces of PET/metal adhesion under damp conditions. For measurement in a damp environment, the operator applies a small quantity of water to simulate a moisture-laden environment.

Barriers

One of the aims of the present invention is to obtain a coated and covered support having enhanced barrier properties, in particular barrier properties to oxygen (O2TR for oxygen transmission rate, and MVTR for water vapour transmission rate).

The measurements of permeability to oxygen are carried out according to standard ASTM F-1927 "Standard Test Method for determination of Oxygen Gas Transmission Rate, Permeance at Controlled Relative Humidity through Barrier Materials using a Coulometric Detector"; the results are expressed in $cc/m^2/d$ (cubic centimeter per square meter per day).

The measurements of permeability to water vapour are carried out according to standard ASTM F-1249 "Standard Test Method for Water Vapour Transmission Rate through Plastic Film and Sheeting using a Modulated Infrared Sensor"; the results are expressed in $mg/m^2/d$ (milligram per square meter per day).

The coated and covered support obtained by the method as defined above has at least one of the following properties:
- an oxygen transmission rate at 23° C. and 50% moisture content at least less than 2 $cc/m^2/d$, preferably less than 1 $cc/m^2/d$, more preferably less than 0.5 $cc/m^2/d$, and/or
- a water vapour transmission rate at 38° C. and 90% moisture content at least less than 2 $mg/m^2/d$, preferably less than 1 $mg/m^2/d$, more preferably less than 0.5 $mg/m^2/d$.

The adhesion properties of the covering and the barrier properties are influenced by the thickness of the coating. The smaller the thickness of the coating, the better the adhesion of the covering under dry and damp conditions and the better the barrier properties. However, the thickness must not go below a minimum value (for example 20 nm) to allow homogeneous distribution of the coating on the support and/or complete coating of the support.

Figure 5:
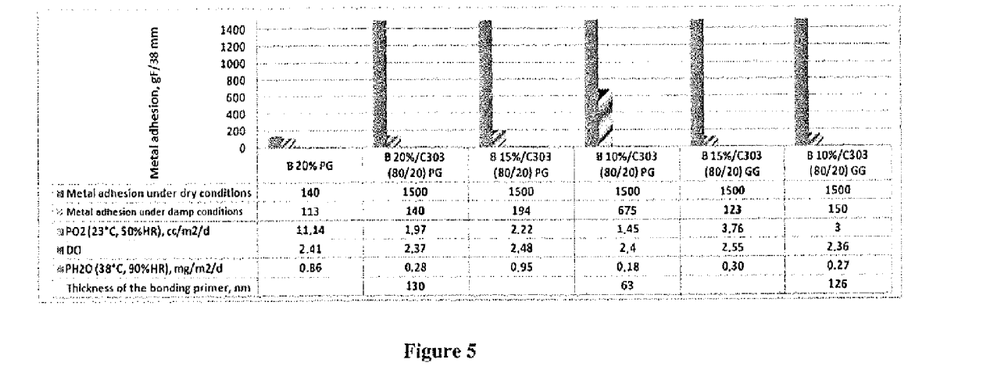
FIG. 5 shows a diagram combined with a table illustrating the adhesion properties under dry and damp conditions, and the barrier properties (O2TR and MVTR) as well as the optical density of a film coated and cross-linked with a latex B with or without cross-linking agent at different coating thicknesses.

A more interpenetrating network of polymers forms, making it more difficult for oxygen and water vapour to penetrate through the coating (cf. FIG. 5 and Table 2).

The barrier properties are observed in particular for metallized films. This is less noticeable with the printable or adhesive films.

Figure 6:
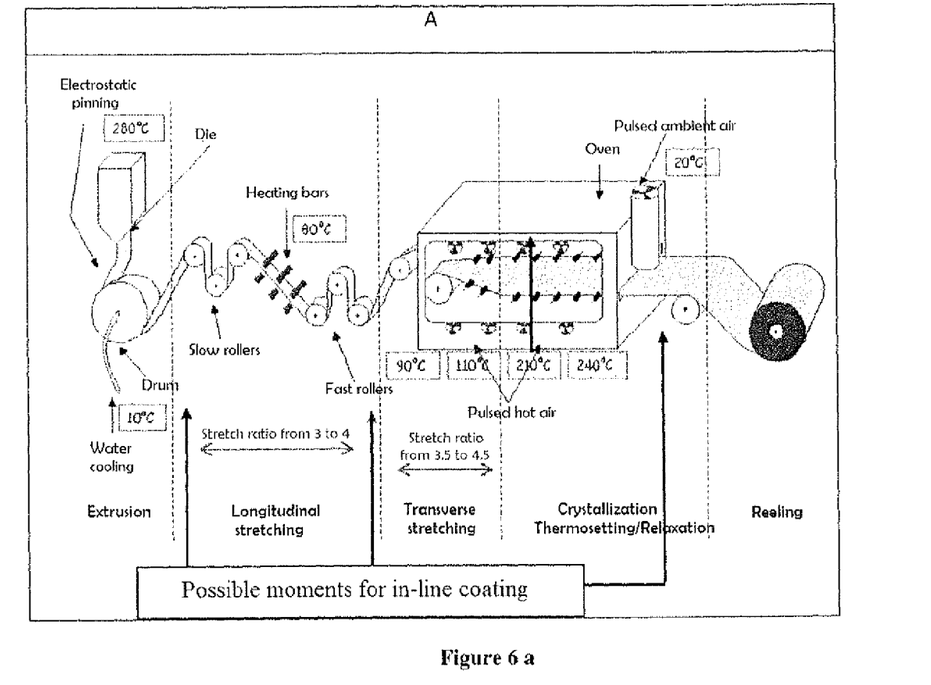
FIG. 6 represents the method of production of a coated film according to the present invention, and in particular the method of in-line coating (a) and in-line coating by reverse gravure (b).

The thickness of the coating may vary with:
- the solids content of the formulation to be coated (cf. examples and FIG. 5, 10 to 20% by weight/total weight), and/or
- the size of the rollers used for application of the aqueous dispersion on the film (cf. FIG. 6)

Applications

The applications of the coated and covered supports according to the present invention are in particular food packaging, medical packaging and the so-called industrial applications (e.g. electrical insulation, electronic components and protective films, optical films, films filtering a part of the light spectrum, films for agriculture or building), printable films or else the decoration or protection of supports.

Regarding packaging, it may be packaging of food products from their manufacture/production site to their arrival with the final consumer. These films have been developed quite especially for providing a barrier either to gases (oxygen, nitrogen, helium, water vapour, etc.) or to aromas. This may also be a packaging film for cooking foodstuffs in a microwave oven.

It may also be packaging for protecting various industrial products such as domestic electrical appliances, electronic components, etc.

Regarding decoration, these films are used for creating surfaces of the simulated wood type, for example.

Regarding films or sheets for graphic art, they may be printable supports, covered with inks or not.

FIGURES AND TABLES

FIG. 7 shows a schematic diagram of the PET/DAP complex in the adhesion test AT.

FIG. 8 shows a schematic diagram of the test specimen fixed on a plate between the jaws of the dynamometer, used in the adhesion test AT.

Table 1 shows different coating compositions according to the invention applied on a support according to the invention and their gel content values (in percentage by weight/total weight of polymers) after drying the coating at 110° C.

Table 2 shows the values of barrier properties of a coating containing or not containing a cross-linking agent and according to different coating thicknesses.

EXAMPLES

Example 1—Properties of the Dispersions According to the Invention

The dispersions according to the invention (latex A prepared as in example 1 of application EP 0260203 B1 and latex B marketed under the name BT-67 by the company DSM, to which the cross-linking agent X or Y is added in proportions of 90/10 or 80/20 corresponding to the Latex/Cross-linking Agent ratio in dry/dry weight) are investigated for their capacity for cross-linking as a function of the temperature (MFFT in ° C. which is the minimum film-forming temperature), and as a function of the glass transition temperature of the copolymer (Tg in ° C.).

The latex A without cross-linking agent corresponds to an aqueous dispersion comprising particles of acrylic and/or methacrylic polymer(s) and having either, on the one hand, a gel content below 50% by weight relative to the total weight of acrylic and/or methacrylic polymer(s) and, on the other hand, a content of copolymer(s) of acrylic and/or methacrylic acid(s) of at least 10% of the total weight of the polymers.

The latex B without cross-linking agent corresponds to an aqueous dispersion comprising particles of acrylic and/or methacrylic polymers having a gel content of at least 50% by weight relative to the total weight of acrylic and/or methacrylic polymer(s).

The cross-linking agent used is Cymel 303 LF (called C303 LF or X hereinafter) or Cymel 1123 (called C1123 or Y hereinafter) from Cytec Industries Inc.

Below the glass transition temperature, the molecules have low relative mobility. The glass transition temperature Tg of a polymer is a useful indicator of flexibility. If Tg is too high (>80 or 90° C.) it may be expected to encounter problems of microcracks in the bonding primer, thus generating coating defects, which in their turn generate metallizing or printing defects.

If the size of the particles in nanometers is small, this makes it possible to limit the water sensitivity of the bonding primer. In fact, the smaller the size at constant dry extract, the greater is the number of particles. This helps to reduce the space between the particles and thus decrease the voidage where water may be trapped or absorbed when the coated PET film is brought into contact with water.

The gel content is measured after drying the coating at 110° C. in % by weight relative to the total weight of polymers.

TABLE 1

| Latex | MFFT, ° C. | Tg, ° C. | dp, nm | Gel content after drying of the coating |
|---|---|---|---|---|
| Latex A[1] | 40 | 64 | 50-80 | 9 |
| Latex A + Cross-linking agent X (90/10)[2] |  | ∞ | 50-80 | 80 |
| Latex A + Cross-linking agent Y (90/10) |  | ∞ | 50-80 | 60 |
| Latex A + Cross-linking agent X (80/20) |  | ∞ | 50-80 | 90 |
| Latex A + Cross-linking agent Y (80/20) |  | ∞ | 50-80 | 70 |
| Latex B[3] | 17 | 20 | <100 | 90 |
| Latex B + Cross-linking agent X (90/10) |  | ∞ | <100 | 95 |
| Latex B + Cross-linking agent Y (90/10) |  | ∞ | <100 | 90 |
| Latex B + Cross-linking agent X (80/20) |  | ∞ | <100 | 95 |
| Latex B + Cross-linking agent Y (80/20) |  | ∞ | <100 | 90 |

[1]Latex not cross-linked, comprising a di-acrylic monomer (ethylene glycol dimethacrylate) in the dispersion, contributing to formation of branchings in the resultant latex.
[2]Latex/Cross-linking Agent ratio in dry/dry weight.
[3]Commercial latex described as an acrylic latex already cross-linked.

Cross-linking agent X makes it possible to obtain somewhat better results for obtaining gel after drying than cross-linking agent Y, which for its part develops better properties of resistance to chemicals or to water and better flexibility.

Example 2—Preparation of a PET Film Coated with a Coat of Bonding Primer (Latex A+Cross-Linking Agent)

The bonding primer dispersion according to example 1 is implemented: latex A (15 or 20% of dry extract)+cross-linking agent X or Y (with a latex/cross-linking agent ratio of 80/20 dry extract/dry extract). This dispersion is coated on the support by an in-line heliographic coating process according to FIG. 6b (pilot machine Toray Film Europe). The rotating helio roller leads to dispersion coating on the PET film. The small or large heliogravure rollers may be used for in-line coating. The coating is dried using infrared radiation at a wavelength of the order of 2 μm. The results for the properties of this coated film are given in Table 2.

Example 3—Preparation of a PET Film Coated with a Coat of Bonding Primer (Latex B+Cross-Linking Agent)

Example 2 is implemented with a different dispersion, namely latex B (10-15 or 20% of dry extract)+cross-linking agent X or Y (with a latex/cross-linking agent ratio of 80/20 dry extract/dry extract). The results for the properties of this coated film are given in Table 2.

Example 4—Preparation of a PET Film Coated with a Coat of Bonding Primer and Covered with a Layer of Metal The PET film coated with a coat of bonding primer according to example 2 or 3 is covered with a layer of aluminium obtained by evaporation under vacuum (4×10-4 mbar) in a conventional industrial metallizing process (Top-Met machine from Applied Materials). In the course of metallizing, the thickness of the layer of metal is monitored by a measurement of film transparency expressed in terms of optical density OD. The OD selected for the present example is between 2.4 and 3.0, which corresponds to a thickness of the metal layer from 30 to 60 nm.

By a similar method and using the same equipment, it is possible to prepare a PET film coated with a coat of bonding primer and a layer of aluminium oxide with a thickness of about 10 nm.

Figure 1:
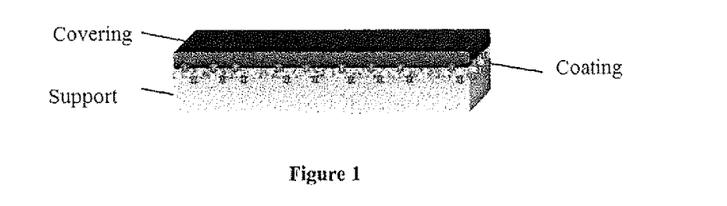
FIG. 1 shows a support (PET film) coated and covered according to the present invention.
Figure 2:
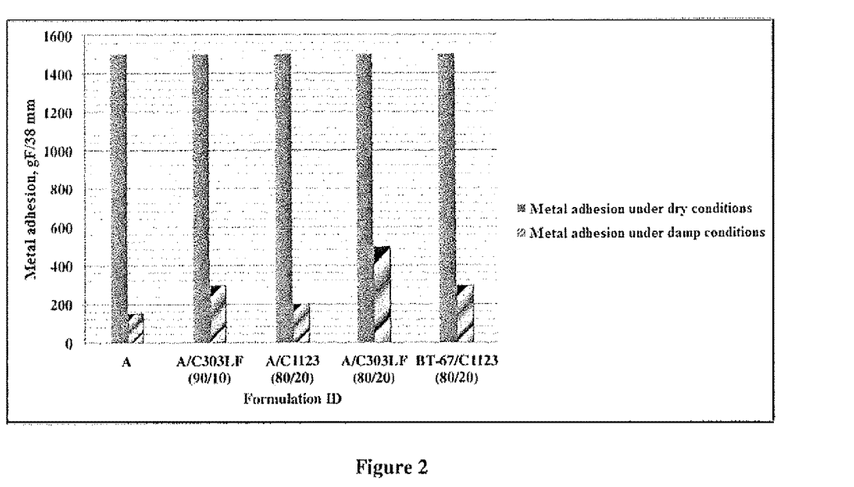
FIG. 2 shows a diagram of the adhesion of the metal covering under dry or damp conditions to latex A with or without addition of cross-linking agent and at different ratios (latex/cross-linking agent).

Example 5—Adhesion Properties of a PET Film Coated with a Coat of Bonding Primer and Covered with a Layer of Metal According to the Invention The results are given in FIG. 2.

C303LF and C1123 are the cross-linking agents used, from Cytec Industries Inc. The data in parentheses correspond to the latex A/cross-linking agent ratio in percentage by weight dry/dry.

It can be seen that latex A without cross-linking agent does not allow sufficient adhesion of the metal covering under damp conditions. However, latex A combined with cross-linking agent X (C303 LF) and Y (C1123) in the proportions indicated (90/10 and 80/20) applied on a PET film gives very satisfactory results with adhesion of the metal of at least 200 gF/38 mm. Coating the PET film with a latex A combined with a cross-linking agent X (80/20) gives the best results of adhesion of the aluminium metal deposited by vacuum evaporation according to the standard process conditions.

Figure 3:
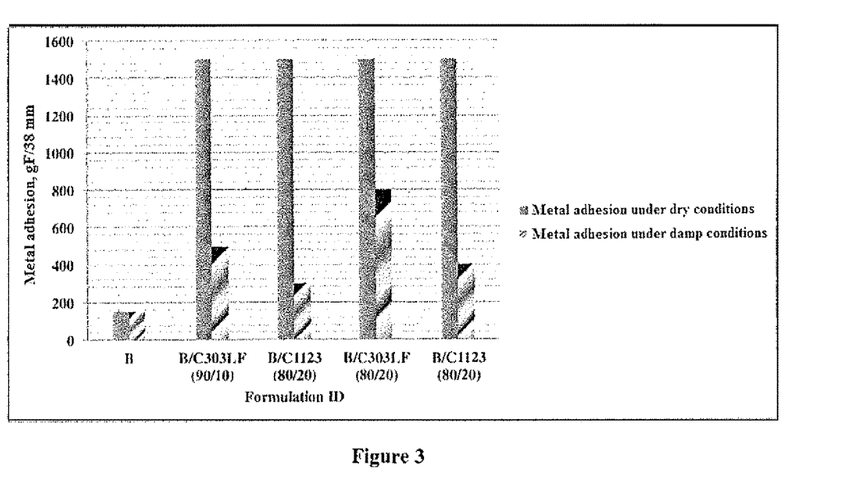
FIG. 3 shows a diagram of the adhesion of the metal covering under dry or damp conditions to latex B with or without addition of cross-linking agent and at different ratios (latex/cross-linking agent).

Example 6—Adhesion Properties of a PET Film Coated with a Coat of Bonding Primer and Covered with a Layer of Metal According to the Invention The results are shown in FIG. 3.

C303LF and C1123 are the cross-linking agents used, from Cytec Industries Inc. The data in parentheses correspond to the latex A/cross-linking agent ratio in percentage by weight dry/dry.

It can be seen that latex B without cross-linking agent does not allow sufficient adhesion of the metal covering. However, latex B combined with cross-linking agent X (C303 LF) and Y (C1123) in the proportions indicated (90/10 and 80/20) applied on a PET film gives very satisfactory results with adhesion of the metal of at least 250 gF/38 mm. Coating the PET film with a latex B combined with a cross-linking agent X (80/20) gives the best results of adhesion of aluminium metal to the PET film. The aluminium is deposited by vacuum evaporation according to the standard process conditions.

As can be seen from FIGS. 2 and 3, adhesion of the metal covering obtained with a latex already cross-linked (latex B) is significantly increased after additional cross-linking obtained by adding the cross-linking agent. The effect of the cross-linking agent is confirmed by measuring the gel content (cf. Table 1), where an increase in gel content is observed when cross-linking agent X is added to latex B. In this case, interfacial cross-linking is promoted and the creation of polarity at the particle interface gives good results for adhesion of the metal to the support (see FIG. 4): the melamine groups generate interactions with the aluminium atoms, forming chelates. The adhesion performance is therefore increased since these polar groups are more accessible to the interface of the particles relative to the scenario with latex A since the cross-linking agent X is distributed in the polymer particles and at the interface of the particles owing to the low initial gel rate of latex A (cf. Table 1).

Example 7—Adhesion Properties and Barrier Properties of a PET Film Coated with a Coat of Bonding Primer (Latex B+Cross-Linking Agent X) and Covered with a Layer of Metal According to the Invention FIG. 5 illustrates the adhesion performance of a metal covering (aluminium) under dry and damp conditions, oxygen transmission rate (PO2), water vapour transmission rate (PH2O), optical density (OD) of the metal layer coated on a latex B with or without cross-linking agent X (C303LF) at the ratio 80/20 and with different coating thicknesses: PG corresponds to "small reverse gravure roller" and GG corresponds to "large reverse gravure roller".

The measurements of permeability to oxygen are carried out with the OXTRAN 2/20 according to standard ASTM F-1927 "Standard Test Method for determination of Oxygen Gas Transmission Rate, Permeance at Controlled Relative Humidity through Barrier Materials using a Coulometric Detector"; the results are expressed in cc/m$^2$/day.

The measurements of permeability to water vapour are carried out according to standard ASTM F-1249 "Standard Test Method for Water Vapour Transmission Rate through Plastic Film and Sheeting using a Modulated Infrared Sensor"; the results are expressed in g/m²/day. The measurements of permeability to water vapour of the films are carried out on the Permatran-W®3/31 with the Mocon—Water Vapor Permeation Analysis System software.

As an example, FIG. 5 shows that all the performance data for this formulation (Latex B+Cross-linking agent X or C303 LF) are greatly influenced by the thickness of the coating. The thickness of the coating varies as a function of two parameters:
- the solids content of the formulation to be coated (10, 15 and 20% by weight of the total weight of the formulation to be coated, and/or
- the size of the rollers used for applying the dispersion with the cross-linking agent to be coated on the PET film.

FIG. 5 shows a significant increase in adhesion of metal to latex B and the cross-linking agent X (C303 LF) when the coating thickness is small and when latex B is cross-linked even more during the step of drying the coating. FIG. 5 and Table 2 show that the barrier properties of latex B additionally cross-linked with cross-linking agent X (C303 LF) are significantly increased relative to the original latex B. The same applies to latex A cross-linked with cross-linking agent X (C303 LF) relative to the original latex A. Consequently, a more interpenetrating network of polymers forms, making it more difficult for oxygen and water vapour to penetrate through the coating.

TABLE 2

| | PO2 (50% moisture content, 23° C.), cc/m²/d | PH2O (90%, 38° C.), g/m²/d | Thickness of the coating (produced on coated PET, before the step of covering with metal) | Thickness of the coating estimated on the basis of the consumption of the dispersion in the production line | OD (optical density) |
|---|---|---|---|---|---|
| Latex B (20% ES, PG) | 11.14 | 0.86 | >100 nm | | 2.4 |
| Latex B/X (80/20) (20% ES, PG) | 1.97 | 0.28 | 130 ± 20 nm | | 2.4 |
| Latex B/X (80/20) (10% ES, PG) | 1.45 | 0.18 | 63 ± 20 nm | | 2.4 |
| Latex B/X (80/20) (10% ES, GG) | 3.00 | 0.27 | 126 ± 20 nm | | 2.4 |
| Latex B/X (80/20) (15% ES) | 1.00 | 0.30 | | 80 nm | 2.4 |
| Latex A | <0.5 | 0.3-0.7 | | 80 nm | 2.4 |
| Latex A/X (80/20) (15% ES) | <0.3 | <0.3 | | 60 nm | 2.4 |
| Latex A/X (80/20) (20% ES) | <0.3 | <0.3 | | 80 nm | 2.4 |

In the above table:
ES means dry extract
PG means small gravure and indicates that coating was carried out with small rollers
GG means large gravure and indicates that coating was carried out with large rollers
X corresponds to the cross-linking agent used, namely Cymel 303.
The Latex/Cross-linking Agent ratio by weight dry/dry is shown in parentheses, for example (80/20).

This table also shows that the barrier properties improve with the decrease in thickness of the coating as far as a certain limit. This is correlated with the effectiveness of cross-linking in the coating drying step. With a coating of small thickness, more effective curing is observed between latex B and cross-linking agent X owing to the in-line coating process. Consequently, a more interpenetrating network of polymers forms, making it more difficult for oxygen and water vapour to penetrate through the coating.

The invention claimed is:

1. Method for coating a support with at least one coat of bonding primer, comprising the implementation of the following steps:
   a) a support is implemented,
   b) optionally, a physical surface treatment of the corona or plasma type is carried out,
   c) at least one face of said support is coated with an aqueous dispersion comprising:
      particles of acrylic and/or methacrylic polymer(s) having:
         either (I) a gel content below 50% by weight relative to the total weight of acrylic and/or methacrylic polymer(s), and a content of copolymer(s) of acrylic and/or methacrylic acid(s) of at least 10% of the total weight of the polymers,
         or (II) a gel content of at least 50% by weight relative to the total weight of acrylic and/or methacrylic polymer(s),
      and
      at least one cross-linking agent,
   and the coating is made to cross-link in order to produce a primer coat allowing the bonding of a covering, the residual content of free acid functions of the copolymer(s) at the surface being at least 5% by weight relative to the total weight of polymer(s),
   wherein when the particles of acrylic and/or methacrylic polymer(s) are the particles having (I) a gel content below 50% by weight relative to the total weight of acrylic and/or methacrylic polymer(s), and a content of copolymer(s) of acrylic and/or methacrylic acid(s) of at least 10% of the total weight of the polymers, then a weight ratio of the particles of acrylic and/or methacrylic polymer(s) to the cross-linking agent is about 80/20 (weight/weight).

2. Method according to claim 1, wherein it further comprises two steps of perpendicular stretching of the support, at least one step of which is carried out before or after steps b) or c), in order to obtain a two-dimensional final stretching.

3. Method according to claim 1, wherein steps b) and c) are carried out in-line.

4. Method according to claim 1, wherein the support in step a) is a polyester film, with a thickness A such that:

$A \leq 150$ µm.

5. Method according to claim 1, wherein the bonding primer coat has a thickness E such that:

$E < 200$ nm.

6. Method for covering a support coated with at least one coat of bonding primer as obtained by the method as defined in claim 2, wherein it comprises a step of application of a covering capable of reacting with the bonding primer coat.

7. Method according to claim 6, wherein said covering comprises:
at least one layer of at least one metal and/or at least one metal oxide, or
at least one layer of ink, or
at least one layer of adhesive.

8. Method according to claim 7, wherein the covering consists of a layer of metal and/or of metal oxide, the metal (or metals) being selected from aluminium, copper, nickel, silver, gold, and alloys thereof, and the metal oxide(s) being selected from the oxides of aluminium, silicon, copper, nickel, silver and mixtures thereof.

9. Method according to claim 1, wherein at least one portion of the surface of the support is modified by an electric discharge of the corona type under ambient air or gas, at high partial pressure.

10. Support obtained by the method as defined in claim 6, wherein an adhesion of the covering of at least 200 gF/38 mm measured by the adhesion test AT.

11. Support obtained by the method as defined in claim 8, wherein it has at least one of the following properties:
an oxygen transmission rate at 23° C. and 50% moisture content at least less than 2 cc/m²/d, and/or
a water vapour transmission rate at 38° C. and 90% moisture content at least less than 2 mg/m²/d.

12. Support according to claim 10, wherein it comprises recycled product from the support itself and/or from the coated support and/or from the coated and covered support.

13. Article selected from the group constituted by food and non-food packaging, films or sheets for graphic art (printing or drawing), films or sheets for decoration and films or sheets for support protection, wherein it comprises a support as defined in claim 10 or as obtained at the end of the method.

14. Aqueous dispersion, in particular for carrying out the method according to claim 1, wherein it comprises:
i) particles of acrylic and/or methacrylic polymer(s) having either (I) a gel content below 50% by weight relative to the total weight of acrylic and/or methacrylic polymer(s), and a content of copolymer(s) of acrylic and/or methacrylic acid(s) of at least 10% of the total weight of the polymer(s), or (II) a gel content of at least 50% by weight relative to the total weight of acrylic and/or methacrylic polymer(s), and
ii) at least one cross-linking agent, suitable for allowing interfacial cross-linking, present in an quantity such that the interfacial cross-linking of the particles of acrylic and/or methacrylic polymer(s) leads to a residual content of at least 5% by weight of free acid functions of the copolymer(s) at the surface relative to the total weight of polymer(s),
wherein when the particles of acrylic and/or methacrylic polymer(s) are the particles having (I) a gel content below 50% by weight relative to the total weight of acrylic and/or methacrylic polymer(s), and a content of copolymer(s) of acrylic and/or methacrylic acid(s) of at least 10% of the total weight of the polymers, then a weight ratio of the particles of acrylic and/or methacrylic polymer(s) to the cross-linking agent is about 80/20 (weight/weight).

15. Method according to claim 1, wherein the particles of acrylic and/or methacrylic polymer(s) have a gel content below 50% by weight relative to the total weight of acrylic and/or methacrylic polymer(s), and a content of copolymer(s) of acrylic and/or methacrylic acid(s) of at least 10% of the total weight of the polymers.

16. Method according to claim 1, wherein the particles of acrylic and/or methacrylic polymer(s) have a gel content of at least 50% by weight relative to the total weight of acrylic and/or methacrylic polymer(s).

* * * * *